(12) United States Patent
Griffis et al.

(10) Patent No.: US 9,715,468 B2
(45) Date of Patent: Jul. 25, 2017

(54) METHOD OF PROVIDING TIMING INFORMATION FOR INTERRUPTS

(71) Applicant: Texas Instruments Incorporated, Dallas, TX (US)

(72) Inventors: Bradley James Griffis, Schaumburg, IL (US); David Allan Comisky, St. Charles, IL (US); Merrill Ray Newman, Schaumburg, IL (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 294 days.

(21) Appl. No.: 14/532,632

(22) Filed: Nov. 4, 2014

(65) Prior Publication Data
US 2016/0124875 A1 May 5, 2016

(51) Int. Cl.
*G06F 17/00* (2006.01)
*G06F 13/24* (2006.01)

(52) U.S. Cl.
CPC .................................. *G06F 13/24* (2013.01)

(58) Field of Classification Search
None
See application file for complete search history.

(56) References Cited

U.S. PATENT DOCUMENTS

| | | | | |
|---|---|---|---|---|
| 5,944,840 A * | 8/1999 | Lever | ............... | G06F 11/3419 714/20 |
| 6,543,000 B1 * | 4/2003 | Wright | ............... | G06F 9/4825 710/260 |
| 6,981,165 B2 * | 12/2005 | Marik | ............... | G06F 1/14 713/400 |
| 8,612,660 B2 * | 12/2013 | Koning | ............... | G06F 13/24 703/19 |
| 9,201,821 B2 * | 12/2015 | Machnicki | ............... | G06F 13/24 |

* cited by examiner

*Primary Examiner* — Cheng-Yuan Tseng
(74) *Attorney, Agent, or Firm* — Robert D. Marshall, Jr.; Charles A. Brill; Frank D. Cimino

(57) ABSTRACT

It is desirable for interrupt handling routines to be aware of the interrupt latency—the time between a interrupt request is received and the time when the interrupt service routine begins executing. A method is shown wherein the latency is measured by a dedicated counter and is available to the interrupt service routine. Alternately, a threshold may be set indicating the maximum acceptable latency and the interrupt service routine is signaled when said maximum is reached.

2 Claims, 2 Drawing Sheets

METHOD OF PROVIDING TIMING INFORMATION FOR INTERRUPTS

TECHNICAL FIELD OF THE INVENTION

The technical field of this invention is interrupt processing.

BACKGROUND OF THE INVENTION

In systems programming, an interrupt is a signal to the processor emitted by hardware or software indicating an event that needs immediate attention. An interrupt alerts the processor to a high-priority condition requiring the interruption of the current code the processor is executing (the current thread). The processor responds by suspending its current activities, saving its state, and executing a small program called an interrupt handler (or interrupt service routine, ISR) to deal with the event. This interruption is temporary, and after the interrupt handler finishes, the processor resumes execution of the previous thread. There are two primary types of interrupts:

A hardware interrupt is an electronic alerting signal sent to the processor from an external device, either a part of the computer itself such as a disk controller or an external peripheral. For example, pressing a key on the keyboard or moving the mouse triggers hardware interrupts that cause the processor to read the keystroke or mouse position. Unlike the software type, hardware interrupts are asynchronous and can occur in the middle of instruction execution, requiring additional care in programming. The act of initiating a hardware interrupt is referred to as an interrupt request (IRQ).

A software interrupt is caused either by an exceptional condition in the processor itself, or a special instruction in the instruction set which causes an interrupt when it is executed. The former is often called a trap or an exception and is used for errors or events occurring during program execution that are exceptional enough that they cannot be handled within the program itself. For example, if the processor's arithmetic logic unit is commanded to divide a number by zero, this impossible demand will cause a divide-by-zero exception, perhaps causing the computer to abandon the calculation or display an error message. Software interrupt instructions function similarly to subroutine calls and are used for a variety of purposes, such as to request services from low level system software such as device drivers. For example, computers often use software interrupt instructions to communicate with the disk controller to request data be read or written to the disk.

Each interrupt has its own interrupt handler. The number of hardware interrupts is limited by the number of interrupt request (IRQ) lines to the processor, but there may be hundreds of different software interrupts.

Interrupts are a commonly used technique for computer multitasking, especially in real-time computing. Such a system is said to be interrupt-driven.

SUMMARY OF THE INVENTION

The interrupt latency of a processing system is determined by measuring and quantifying the latency time between the receipt of an interrupt request and the execution of the interrupt service routine (ISR). Alternate embodiments are shown that are operable to communicate the elapsed time to the ISR, with the capability of setting a threshold indicating the maximum acceptable latency, and signaling the ISR when that latency is reached thus enabling the ISR to properly handle excessive latencies.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
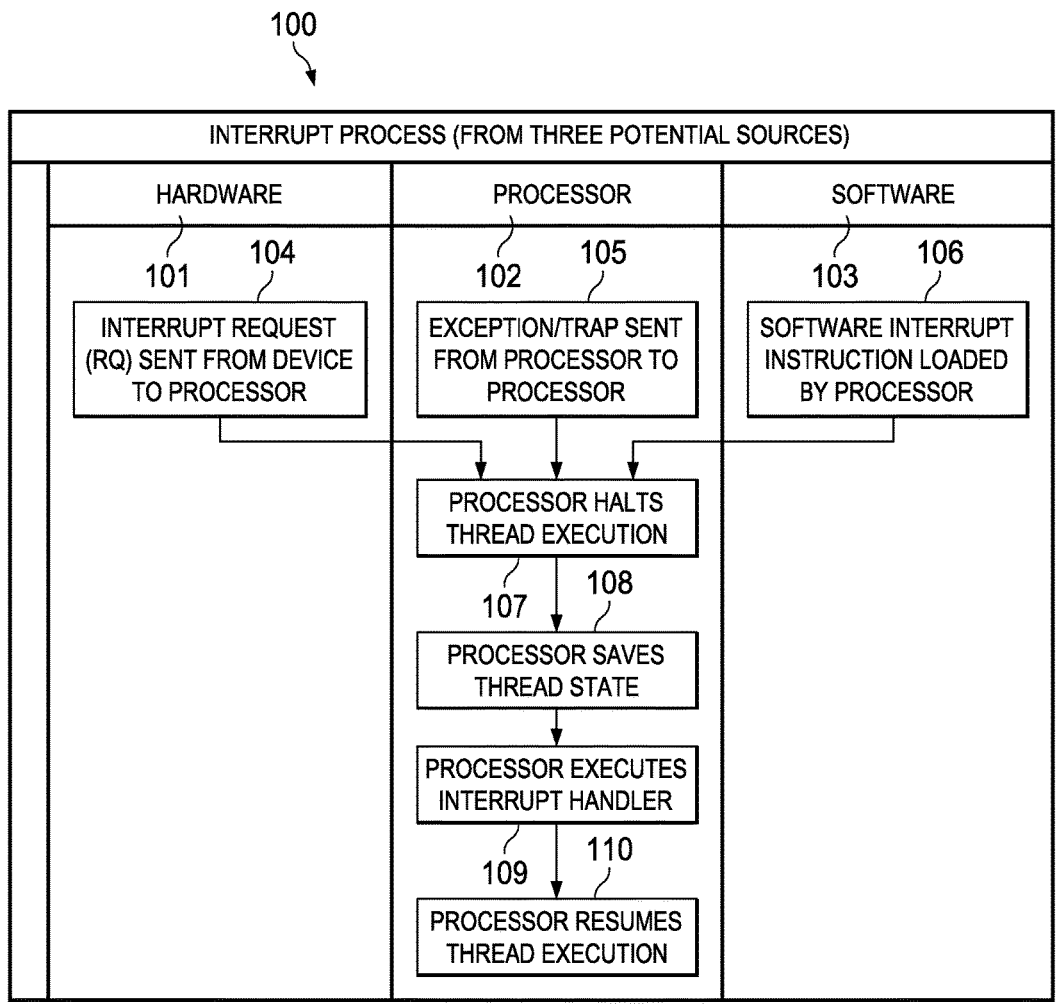
FIG. 1 shows a typical interrupt system applicable to this invention (Prior Art)

FIG. 1 demonstrates a typical (prior art) interrupt implementation. Three interrupt sources are shown: hardware interrupt 102, processor (or system) interrupt 102, and software interrupt 103.

In the case of a hardware interrupt 101, an interrupt request (IRQ) is generated by an external device or peripheral 104, and is sent to the processor for handling. Upon receipt of the interrupt the processor halts program or thread execution as shown in step 107, saves the internal processor state in step 108. Then the processor executes the interrupt handler associated with the device requesting the interrupt in step 109.

After execution of the interrupt service routine is completed, the processors internal state that was saved in step 108 is restored and normal execution is resumed in step 110.

In the case of a processor interrupt 102, the processor detects an internal exception, and requests a software interrupt in step 105. Interrupt processing then continues as in the previous case starting at step 107.

Software interrupt 103 is usually generated by a running program executing an interrupt instruction in step 106. Interrupt processing then continues as in the previous case starting at step 107.

There is a finite elapsed time between the time an interrupt request is presented to a processor, and the time when the interrupt service routine begins servicing the interrupt. Since this delay may be variable depending on interrupt priorities, it is important for the interrupt service routine to be aware of the magnitude of this delay. This invention shows a number of novel ways this may be accomplished.

Figure 2:
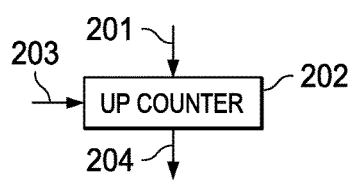
FIG. 2 shows an implementation of this invention.

One implementation is shown in FIG. 2. An up counter 202 is initialized to 0 through reset line 203, and is operable to monitor an interrupt through the count enable line 201. Once an interrupt is detected, counter 202 starts incrementing. The interrupt service routine then may read the content of counter 202 through line 204, thus determining the number of counts and therefore the elapsed time since the interrupt request.

While FIG. 2 shows a single interrupt, this method may be used with any number of interrupts by implementing a separate counter for each interrupt.

Figure 5:
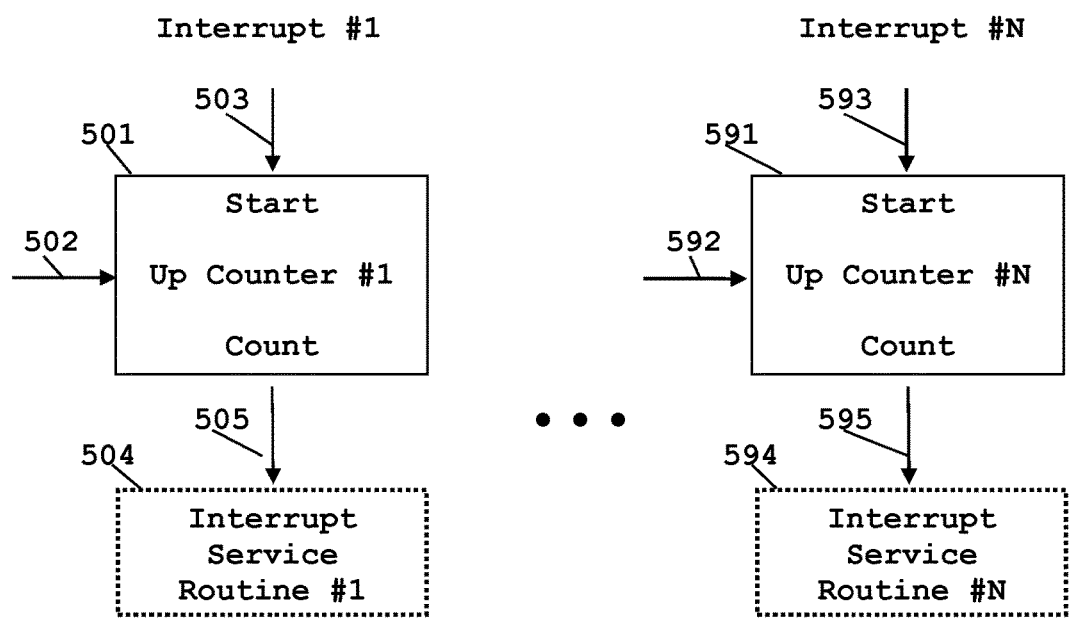
FIG. 5 shows an implementation similar to FIG. 2 having plural up counters, each for a corresponding interrupt.

This is illustrated in FIG. 5. Interrupt #1 up counter 501 is initialized to 0 though reset line 502. Interrupt #1 up counter 501 is enabled to count via interrupt #1 503. Interrupt service routine #1 504 may read interrupt #1 up counter 501 and receive the count via line 505. This count corresponds to the elapsed time between interrupt #1 starting interrupt #1 up counter 501 and interrupt service routine #1 504 reading the count. An up counter is provided for each interrupt, such as interrupt #N up counter 591, which is initialized to 0 though reset line 592 and enabled to count via interrupt #N 593. Corresponding interrupt service routine #N 594 may read interrupt #N up counter 591 via line 505.

Figure 3:
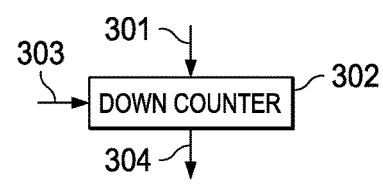
FIG. 3 shows an alternate implementation.

An alternate implementation is shown in FIG. 3 where the invention is configured to detect a latency threshold, beyond which a different response is required. This response may involve the generation of a non-maskeable interrupt to insure faster response, or possibly abandoning the interrupt request.

In this implementation, down counter 302 is preset to the required threshold value through line 303. When an interrupt is detected through line 301, counter 302 starts decrementing. When the count reaches zero, the state of the counter is signaled to the interrupt service routine through line 304 to enable further action.

While FIG. 3 shows a single interrupt, this method may be used with any number of interrupts by implementing a separate counter for each interrupt.

Figure 4:
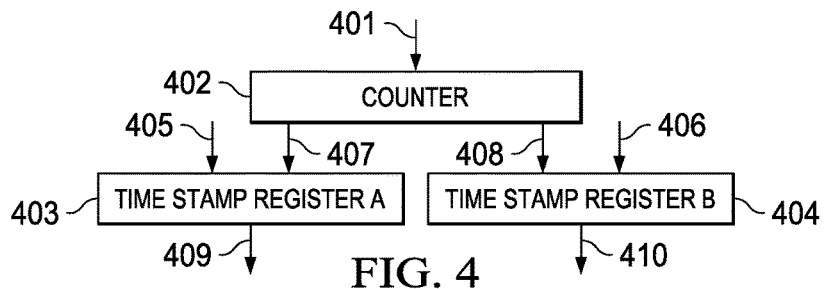
FIG. 4 a different embodiment using time stamps.

Another embodiment of this invention is shown in FIG. 4. A shared counter 402 continually counts system clock pulses on line 401. An individual time stamp register 403, 404 . . . 40x is implemented for each interrupt in the system. As shown in the drawing time stamp register A is connected to interrupt request source 405. Upon detecting an interrupt the content of counter 402 is copied to time stamp register a through line 407, and the interrupt service routine then may read the time stamp register through line 409 to determine when the interrupt request has occurred.

Similarly, time stamp register B is connected to interrupt request source 406. Upon detecting an interrupt the content of counter 402 is copied to time stamp register a through line 408, and the interrupt service routine then may read the time stamp register through line 410 to determine when the interrupt request has occurred.

While FIG. 4 shows 2 interrupt sources, the implementation may be expanded to any number of interrupts. This approach also has the advantage of showing relative timing between multiple interrupt sources.

As a simplification, counter 402 may be eliminated, and the time stamp registers may read the system time register, if such is available.

What is claimed is:

1. A method of measuring interrupt latency comprising the steps of:
   starting one of a plurality of up counters upon receipt of an interrupt request, said up counter started corresponding to the received interrupt request, wherein each interrupt request has a different one of the plurality of up counters; and
   reading said up counter by an interrupt service routine corresponding to the received interrupt request, said interrupt service routine determines the elapsed time between receipt of the interrupt request and an execution of the corresponding interrupt service routine.

2. An interrupt latency measurement system comprising:
   a plurality of interrupt requests;
   a plurality of up counters, each up counter operable to count periodic clock pulses upon receipt of a count enable signal provided by the receipt of an a corresponding interrupt request, wherein each one of the plurality of interrupt request has a different one of the plurality of up counters; and
   an interrupt service routine corresponding to the received interrupt request operable to read said corresponding up counter to determine an elapsed time between the receipt of the corresponding interrupt request and an execution of the corresponding interrupt service routine.

* * * * *